3,370,978

METHOD OF STABILIZING TUNNELING INSULATOR FILMS

Solomon Robert Pollack, Philadelphia, and Clarence Edward Morris, Audubon, Pa., assignors to Sperry Rand Corporation, New York, N.Y., a corporation of Delaware No Drawing. Filed Feb. 26, 1964, Ser. No. 347,379

4 Claims. (Cl. 117—217)

ABSTRACT OF THE DISCLOSURE

It has been found that thin-film structures, particularly thin-film structures containing a thin-film tunneling insulator film, have improved electrical properties imparted thereto if the thin insulator film is subjected to a vacuum annealing operation substantially immediately after the insulator film has been laid down, such as a vacuum annealing operation carried out at a temperature at a range 5–40° C. and at an absolute pressure not greater than about $1 \times 10^{-4}$ torr. Following the vacuum annealing operation, the resulting thin-film structure can be completed. The resulting completed structure can then be subjected to a heat treatment operation, preferably in a vacuum, for a period of time of at least about 15 minutes and preferably at a temperature upwards of 100° C., such as a temperature in the range of about 150–170° C.

This invention relates to thin film tunneling insulator films having improved electrical properties. More particularly, in accordance with one embodiment this invention relates to the treatment of thin film tunneling insulator films to improve the electrical properties thereof. In accordance with yet another embodiment this invention relates to thin film structures containing a tunneling insulator film having improved electrical properties.

Thin film structures characterized by a thin film tunneling insulator film, such as a thin film tunnel diode or thin film triodes, and methods of producing the same, are known, see Mead U.S. Patent 3,056,073. This patent discloses solid state electron devices comprising a thin tunneling insulator film, such as an insulator film having a thickness in the range 10–60 A. deposited between two metal films in electrical contact with the insulator film. It is also known to produce thin film structures comprising a thin tunneling insulator film having improved physical properties, such as "self-healing" properties, see our copending, co-assigned patent application Ser. No. 248,112 filed December 28, 1962 and now abandoned. The disclosures of the above-identified patent and patent application are herein incorporated and made part of this disclosure.

One deficiency of previously known thin tunneling insulator films is that such thin insulating films in actual use, such as in a thin film tunneling diode structure, appear to exhibit deteriorating or otherwise undesirable electrical properties upon continued use or with age.

It is an object of this invention to provide thin tunneling insulator films, and structures containing the same, such as a thin film tunneling diode, having improved electrical properties.

It is another object of this invention to provide a method for the manufacture of thin tunneling insulator films having improved electrical properties.

Still another object of this invention is to provide a method for the manufacture of thin film structures, particularly thin film structures comprising a thin tunneling insulator film positioned in electrical contact between two metal films, having improved electrical properties.

Yet another object of this invention is to provide time stable tunneling insulator films and to provide a method of producing the same.

How these and other objects of this invention are achieved will become apparent in the light of the accompanying disclosure.

In accordance with this invention it has been discovered that the electrical properties of a thin tunneling insulator film, such as a tunneling insulator film of a thin film tunnel diode, are improved by subjecting the insulator film when deposited upon a suitable substrate to a vacuum annealing operation. In accordance with this invention the vacuum annealing operation is carried out under conditions to effect substantially complete degassing of the tunneling insulator film.

Generally satisfactory results have been obtained by carrying out the vacuum annealing operation at a temperature in the neighborhood of room temperature, such as a temperature in the range 5–40° C., more or less. The vacuum and/or temperature employed during the vacuum annealing operation is such that the degassing of the insulator film undergoing treatment is effected within a reasonable length of time. In this connection satisfactory results have been obtained by carrying out the vacuum annealing operation at an absolute pressure not greater than about $1 \times 10^{-4}$ torr, such as at an absolute pressure in the range $5 \times 10^{-5}$–$5 \times 10^{-6}$ torr, or less.

As indicated, the vacuum annealing operation is carried out under conditions of temperatures and/or pres sure for a period of time sufficient to substantially completely degas the tunneling insulator film undergoing treatment. Usually the time required for the vacuum annealing operation depends upon the temperature employed and the amount of vacuum employed. Generally, satisfactory results have been obtained when the vacuum annealing operation has been carried out for a period of time of about 25 minutes, although longer or shorter vacuum annealing times may be employed to yield satisfactory results. Satisfactory results would generally be obtained by carrying out the vacuum annealing operation for a period of time of at least about 60 minutes or one hour. Following the vacuum annealing operation the resulting treated tunneling insulator film exhibits improved electrical properties, such as time stable I–V characteristics and ability to pass higher current densities, such as about 150 amps. per square centimeter at 4 volts.

In the manufacture of a thin film tunneling diode the tunneling insulator film is deposited upon a film of metal and following the vacuum annealing operation a second film of metal is deposited upon the vacuum annealed insulator film. A thin film tunnel diode thus produced exhibits improved electrical properties.

Further improvement in the electrical properties of the thin tunneling insulator film may be effected by subjecting the vacuum annealed insulator film to a heat treatment operation. The subsequent heat treatment operation appears to be effective in further improving the electrical properties of the insulator film by eliminating concentration gradients (anion or cation) across the metal-insulator-metal structure incorporating the vacuum annealed insulator film of this invention. Satisfactory results, as evidenced by improved electrical properties, have been obtained by subjecting a thin film tunnel diode structure, i.e. a thin film structure made up of a thin tunneling insulator film sandwiched between and in electrical contact with two metal films, by subjecting the resulting structure to a heat treatment operation, at a temperature upwards of 100° C., such as a temperature of about 150–170° C. for a suitable period of time, such as at least about 15 minutes, suitably for a period of time in the range 30 minutes–3 hours, more or less. In the heat treatment operation it is not necessary that the thin film structure undergoing heat treatment be under a vacuum or reduced pressure. It is generally preferred, however, to carry out the heat treatment operation at a reduced pressure, preferably substantially below atmospheric, such as at an absolute pressure of about $1\times10^{-4}$ torr, more or less. Preferably, also, the heat treatment operation is carried out in the substantial absence of gaseous oxygen or air.

Although it is preferred in the practice of this invention to carry out the heat treatment operation on the substantially completed thin film structure, i.e. a fully fabricated thin film structure comprising a vacuum annealed tunneling insulator film sandwiched between and in electrical contact with two metal films, it is possible to obtain the benefits of this invention by carrying out the heat treatment operation upon the thin tunneling insulator film, immediately following the vacuum annealing operation and before the exposed vacuum annealed insulator film has deposited or formed thereon another metal film. In this embodiment of the invention the heat treatment operation of the exposed tunneling insulator film is carried out in the substantially complete absence of a reactive gas, particularly, and by way of example, air or gaseous oxygen. In this embodiment, therefore, it is desirable that the heat treatment operation of the exposed tunneling insulator film be carried out under conditions of substantially complete vacuum, preferably at an absolute pressure not greater than that employed during the preceding vacuum annealing operation.

Various tunneling insulator films are susceptible of improvement with respect to electrical properties by employing the practices of this invention. Improved electrical properties as evidenced by time stable voltage-current characteristics and the ability to pass higher current densities have been observed in tunneling aluminum oxide films vacuum annealed and subsequently heat treated in accordance with this invention. Various other tunneling insulator films are susceptible in accordance with the practice of this invention. These various other tunneling insulator films include tantalum oxide, chromium oxide, lead oxide, zirconium oxide, molybdenum oxide, titanium oxide, vanadium oxide, nickel oxide, iron oxide, cobalt oxide and the like.

The metal film upon which the tunneling insulator film is deposited is desirably the metal which is a constituent of the insulator film. For example, when the tunneling insulator film is aluminum oxide desirably the metal film which acts as the substrate and upon which the aluminum oxide insulator film is deposited is metallic or elemental aluminum. Other metal films, however, may be employed and need not correspond to or be an elemental component of the insulator film. Suitable metals which may comprise the substrate upon which the tunneling insulator film is formed, such as by anodic deposition or air oxidation or direct deposition of the insulator material, include aluminum, tantalum, gold, silver, zinc, manganese, zirconium, tin, molybdenum, chromium, nickel, iron, platinum, copper, tungsten and palladium.

Similarly, the other metal film which is deposited upon the vacuum annealed tunneling insulator film may comprise any of the foregoing metals and, if desired, the metal films between which the tunneling insulator film is sandwiched may be made of the same metal or a different metal.

Specific thin film tunnel diode structures which would have improved electrical properties when the practice of this invention is applied thereto include such thin film structures as aluminum-aluminum oxide-aluminum, aluminum-aluminum oxide-gold, tantalum-tantalum oxide-gold, tantalum-aluminum oxide-aluminum, nickel-tantalum oxide-tungsten, tantalum-tantalum oxide-platinum, aluminum-tantalum oxide-tantalum. As will be apparent from the foreging numerous other combinations of metals and insulators, such as thin film tunnel diodes or thin film triodes and tetrodes, all employing a tunneling insulator film having improved electrical properties in accordance with this invention, are possible.

As will be apparent to those skilled in the art in the light of the foregoing disclosures many modifications, changes and substitutions are possible in the practice of this invention without departing from the spirit or scope thereof.

The embodiments of the invention in which an exclusive property or privilege is claimed are defined as follows:

1. A method of preparing a thin film tunnel diode structure having improved electrical properties which comprises, depositing a first film of metal on a suitable substrate, depositing on said first film a second film of insulating material, subjecting said second film to a vacuum annealing operation, said vacuum annealing operation being carried out at a reduced pressure and at substantially room temperature for a period of time to substantially completely degas said second film, depositing on the resulting vacuum annealed second film a third film of metal and subjecting the resulting thin film structure to heat treatment at a temperature in the range 100–170° C. and for a period of time from about 15 minutes to about 3 hours.

2. A method in accordance with claim 1 wherein said first film and said second film comprise aluminum and aluminum oxide, respectively.

3. A method in accordance with claim 1 wherein said first, second and third films comprise aluminum, aluminum oxide and gold, respectively.

4. A method for the preparation of a thin film structure wherein a thin film of insulating material is deposited between and in electrical contact with two metal films which comprises forming a thin film of insulating material on one of said metal films, subjecting the thus-formed film of insulating material to a vacuum annealing operation carried out at about room temperature and at an absolute pressure of not greater than $1\times10^{-4}$ torr for a period of time to substantially completely degas said film of insulating material, depositing on the resulting degassed insulating film the other metal film and subjecting the resulting formed thin film structure to a heat treatment operation carried out for a period of time from about 15 minutes to about 3 hours and at a temperature in the range 100–170° C.

References Cited

UNITED STATES PATENTS

| | | | |
|---|---|---|---|
| 2,907,679 | 10/1959 | Smith | 117—106 X |
| 3,056,073 | 9/1962 | Mead | 317—234 |
| 3,092,522 | 6/1963 | Knowles et al. | 148—1.5 |
| 3,134,691 | 5/1964 | Kopecky | 117—215 |
| 3,226,806 | 1/1966 | Gatewood | 117—215 X |

WILLIAM L. JARVIS, *Primary Examiner.*